United States Patent
Brinkley et al.

(10) Patent No.: US 10,260,824 B2
(45) Date of Patent: Apr. 16, 2019

(54) FLUID COOLER BYPASS SYSTEM FOR AN AGRICULTURAL WORK VEHICLE

(71) Applicant: CNH America LLC, New Holland, PA (US)

(72) Inventors: Jerry Lee Brinkley, Woodridge, IL (US); Guy Thomas Stoever, Minooka, IL (US); Gerard Restaino, III, Dolton, IL (US)

(73) Assignee: CNH Industrial America LLC, New Holland, PA (US)

( * ) Notice: Subject to any disclaimer, the term of this patent is extended or adjusted under 35 U.S.C. 154(b) by 369 days.

(21) Appl. No.: 14/106,383

(22) Filed: Dec. 13, 2013

(65) Prior Publication Data

US 2015/0168089 A1  Jun. 18, 2015

(51) Int. Cl.
*F28F 27/02* (2006.01)
*F28F 27/00* (2006.01)
(Continued)

(52) U.S. Cl.
CPC ............ *F28F 27/02* (2013.01); *F15B 21/042* (2013.01); *F16H 61/12* (2013.01);
(Continued)

(58) Field of Classification Search
CPC ...... F28F 27/02; F16H 61/4165; F16H 61/12; F15B 2211/665; F15B 2211/5157
See application file for complete search history.

(56) References Cited

U.S. PATENT DOCUMENTS 3,913,831 A  10/1975 Talak
4,352,456 A * 10/1982 Brandenburg, Jr. ........................
 B60H 1/00378
 122/26
(Continued)

FOREIGN PATENT DOCUMENTS

DE  102005043110 A1  4/2007
EP  2034380  3/2009
(Continued)

OTHER PUBLICATIONS

Cooler-Bypass Thermostat Valve, Size 10; Bucher Hydraulics; http://www.bucherhydraulics.com/docs/index.aspx?id=40350&addminprt=1; last access Oct. 30, 2013.
(Continued)

*Primary Examiner* — Larry L Furdge
(74) *Attorney, Agent, or Firm* — Rickard K. DeMille; Rebecca L. Henkel

(57) ABSTRACT

A cooler bypass valve assembly for an agricultural implement includes a cooler bypass valve configured to receive hydraulic fluid from a hydraulic supply. The cooler bypass valve position is adjustable between a first position that facilitates flow of the hydraulic fluid to a cooler bypass and restricts flow of the hydraulic fluid to a hydraulic fluid cooler, and a second position that blocks flow of the hydraulic fluid to the cooler bypass and facilitates flow of the hydraulic fluid to the hydraulic fluid cooler. The hydraulic fluid cooler is capable of reducing a temperature of the hydraulic fluid, and the cooler bypass directs the hydraulic fluid around the hydraulic fluid cooler. Additionally, the cooler bypass valve assembly includes a control assembly that controls the cooler bypass valve position based on the temperature of the hydraulic fluid.

20 Claims, 5 Drawing Sheets

(51) Int. Cl.
*F15B 21/042* (2019.01)
*F16H 61/12* (2010.01)
*F16H 61/4165* (2010.01)

(52) U.S. Cl.
CPC ......... *F16H 61/4165* (2013.01); *F28F 27/00* (2013.01); *F15B 2211/4053* (2013.01); *F15B 2211/41572* (2013.01); *F15B 2211/428* (2013.01); *F15B 2211/50536* (2013.01); *F15B 2211/5157* (2013.01); *F15B 2211/526* (2013.01); *F15B 2211/6343* (2013.01); *F15B 2211/66* (2013.01); *F15B 2211/665* (2013.01)

(56) References Cited

U.S. PATENT DOCUMENTS

| | | | |
|---|---|---|---|
| 4,475,485 A | | 10/1984 | Sakakibara et al. |
| 5,007,599 A | * | 4/1991 | Forsyth .............. B65H 75/4489 |
| | | | 191/12.2 A |
| 5,390,632 A | | 2/1995 | Ikebe et al. |
| 5,564,274 A | | 10/1996 | Denbraber et al. |
| 5,666,807 A | | 9/1997 | Bianchetta |
| 5,762,134 A | | 6/1998 | Droste et al. |
| 6,029,445 A | * | 2/2000 | Lech .................... E02F 9/2203 |
| | | | 60/422 |
| 6,386,150 B1 | | 5/2002 | Iwaki |
| 6,397,593 B1 | | 6/2002 | Duckinghaus |
| 6,740,000 B2 | | 5/2004 | Wakayama |
| 8,123,143 B2 | | 2/2012 | Willers et al. |
| 8,464,851 B2 | | 6/2013 | Moorman |
| 2002/0128107 A1 | * | 9/2002 | Wakayama ......... F16H 57/0412 |
| | | | 475/161 |
| 2005/0202933 A1 | * | 9/2005 | Sorab .................. F16H 57/0413 |
| | | | 477/161 |
| 2007/0074515 A1 | | 4/2007 | Yoshino |
| 2009/0025922 A1 | | 1/2009 | Strzelczyk et al. |
| 2011/0132012 A1 | | 6/2011 | Heindl et al. |
| 2011/0173965 A1 | * | 7/2011 | Holmes .............. F16H 61/0031 |
| | | | 60/456 |
| 2012/0152377 A1 | * | 6/2012 | Tabor .................... F15B 11/00 |
| | | | 137/487.5 |
| 2013/0139906 A1 | | 6/2013 | Neelakantan et al. |

FOREIGN PATENT DOCUMENTS

| | | |
|---|---|---|
| EP | 2050970 | 4/2009 |
| GB | 2191847 A | 12/1987 |
| KR | 20110076330 A | 7/2011 |
| WO | 03095927 A1 | 11/2003 |
| WO | 2011032156 A2 | 3/2011 |
| WO | 2013042588 A | 3/2013 |

OTHER PUBLICATIONS

7R Series of Tractors-Hydraulics; John Deer; http://sjequip.com/sales/jd-7-family-of-tractors/; last access Oct. 30, 2013.

Temperature Control Valves » Electrically Operated; Walton Engineering; http://www.waltonengineering.co.uk/TemperatureControlValveslElectricallyOperated.aspx; last access Oct. 30, 2013.

European Search Report for European Application No. 14197501.1 dated Jun. 2, 2015 (7 pages).

\* cited by examiner

FLUID COOLER BYPASS SYSTEM FOR AN AGRICULTURAL WORK VEHICLE

BACKGROUND

The invention relates generally to agricultural work vehicles, and more particularly to a fluid cooler bypass system for an agricultural work vehicle.

A wide range of agricultural implements are known, are presently in use, and are particularly designed for coupling to the hydraulic system of a work vehicle, such as a tractor. Maintaining hydraulic fluid of the hydraulic system at a desired working temperature may enhance the efficiency of the hydraulic system. For this reason, a hydraulic fluid cooler may be included within the hydraulic system to reduce the fluid temperature to at the desired working temperature. Unfortunately, during certain periods of operation (e.g., during startup), the hydraulic fluid cooler may reduce the temperature of the hydraulic fluid below the desired working temperature, thereby increasing the pressure of the hydraulic fluid above a desired operating pressure.

BRIEF DESCRIPTION

A cooler bypass valve assembly for an agricultural implement, in some embodiments, includes a cooler bypass valve configured to receive hydraulic fluid from a hydraulic supply. The cooler bypass valve position is adjustable between a first position that facilitates flow of the hydraulic fluid to a cooler bypass and restricts flow of the hydraulic fluid to a hydraulic fluid cooler, and a second position that blocks flow of the hydraulic fluid to the cooler bypass and facilitates flow of the hydraulic fluid to the hydraulic fluid cooler. Further, the hydraulic fluid cooler reduces a temperature of the hydraulic fluid and directs the hydraulic fluid to a hydraulic system, and the cooler bypass directs the hydraulic fluid around the hydraulic fluid cooler to the hydraulic system. Furthermore, the cooler bypass valve assembly includes a control assembly that controls the cooler bypass valve position based on the temperature of the hydraulic fluid.

In another embodiment, a cooler bypass valve assembly for an agricultural implement includes a valve block. The valve block includes a housing and a cooler bypass valve disposed within the housing and moveable between a cooler bypass position and a cooler position. Additionally, the cooler bypass valve receives hydraulic fluid from a hydraulic fluid supply, and the cooler bypass valve facilitates flow of the hydraulic fluid to a cooler bypass and restricts flow of the hydraulic fluid to a hydraulic fluid cooler while the cooler bypass valve is in the cooler bypass position. Further, the cooler bypass valve blocks flow of the hydraulic fluid to the cooler bypass and facilitates flow of the hydraulic fluid to the hydraulic fluid cooler while the cooler bypass valve is in the cooler position. Furthermore, the hydraulic fluid cooler reduces a temperature of the hydraulic fluid, and the cooler bypass directs the hydraulic fluid around the hydraulic fluid cooler to the hydraulic system. Moreover, a flow control valve disposed within the housing selectively transitions the cooler bypass valve between the cooler bypass position and the cooler position by controlling hydraulic fluid pressure to one side of the cooler bypass valve.

In yet another embodiment, a cooler bypass valve assembly for an agricultural implement includes a cooler bypass valve fluidly coupled to an inlet of the cooler bypass valve assembly. The cooler bypass valve facilitates flow of hydraulic fluid from the inlet to a cooler bypass and restricts flow of hydraulic fluid to an outlet of the cooler bypass valve assembly while a first hydraulic pressure at the outlet exceeds a second hydraulic pressure at the inlet by a threshold value. Further, the cooler bypass valve blocks flow of the hydraulic fluid to the cooler bypass and facilitates flow of the hydraulic fluid to the outlet otherwise. Furthermore, the outlet extends to a hydraulic fluid cooler to reduce a temperature of the hydraulic fluid, and the cooler bypass directs the hydraulic fluid around the hydraulic fluid cooler to a hydraulic system. Moreover, the cooler bypass valve assembly includes a flow control valve fluidly coupled to the inlet. The flow control valve is adjustable to vary hydraulic pressure at the inlet to control the cooler bypass valve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
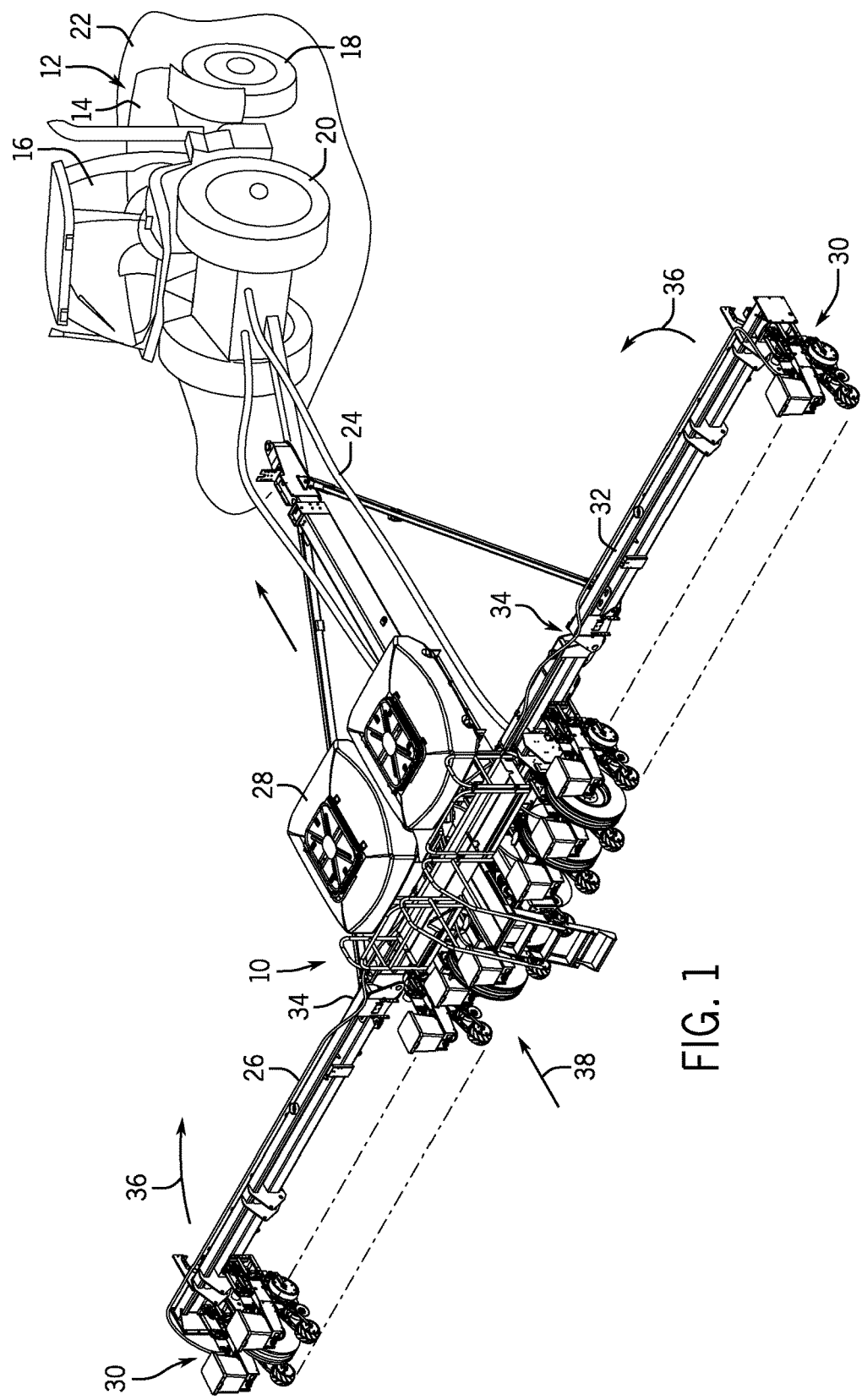
FIG. 1 is a perspective view of an embodiment of an agricultural implement coupled to a work vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the cooler bypass system described herein may facilitate enhanced control of hydraulic fluid temperature with a hydraulic system of an agricultural implement. In certain embodiments, a hydraulic pump of a work vehicle directs hydraulic fluid toward a hydraulic system of an agricultural implement to drive hydraulically powered devices of the agricultural implement. The hydraulic fluid may efficiently drive the hydraulically powered devices while a temperature of the fluid is within a desired temperature range (e.g., due to varying viscosity of the hydraulic fluid at varying temperatures). To reach the desired hydraulic fluid temperature, the hydraulic fluid may bypass a hydraulic fluid cooler. In at least one embodiment, the bypass may be accomplished using a cooler bypass valve. The cooler bypass valve receives the hydraulic fluid from a hydraulic fluid supply and is adjustable between a first position that directs the hydraulic fluid to a cooler bypass and a second position that directs the hydraulic fluid to the hydraulic fluid cooler. The position of the cooler bypass valve, in at least one embodiment, is controlled by fluid pressure within a pilot line extending to the cooler bypass valve. A flow control valve is coupled to the pilot line. While the flow control valve is in a closed position, the pressure in the pilot line urges the cooler bypass valve toward the second position. When the flow control valve is in an open position, the pressure in the pilot line decreases, thereby enabling the cooler bypass valve to move toward the first position. Bypassing the hydraulic fluid cooler enables a temperature of the hydraulic fluid to rapidly increase upon starting the work vehicle. As a result, the hydraulic fluid quickly achieves a temperature that facilitates efficient operation of the hydraulic system and maintains the pressure at a desirable level.

Turning now to the drawings, FIG. 1 is a perspective view of an embodiment of an agricultural implement 10 and a work vehicle 12. The illustrated work vehicle 12 has a body 14 that houses an engine, transmission (e.g., gear box), cooling system, and power train. The work vehicle 12 has a cabin 16 where an operator may sit or stand to operate the vehicle 12. The work vehicle 12 has two front wheels 18 and two rear wheels 20 that rotate to move the work vehicle 12 along the ground 22 at a ground speed. In some embodiments, the work vehicle 12 may have tracks rather than one or both sets of wheels 18, 20.

The agricultural implement 10 (e.g., planter) is towed behind the work vehicle 12 across the ground 22, as shown in FIG. 1. The work vehicle 12 supplies a working fluid (e.g., hydraulic fluid) to the agricultural implement via one or more fluid lines 24. One or more motors (e.g., hydraulic motors) receive the working fluid from the work vehicle 12 and drive systems of the agricultural implement 10. For example, one or more hydraulic motors may drive a fan and/or seed drive to direct agricultural material (e.g., seeds, fertilizer, etc.) along supply lines 26 from tanks 28 to multiple row units 30 distributed along a frame assembly 32. Each row unit 30 may be configured to deposit seeds at a desired depth beneath the soil surface, thereby establishing rows of planted seeds.

The agricultural implement 10 may have a variety of systems driven by the working fluid (e.g., hydraulic fluid) supplied by the work vehicle 12. For example, motors of the agricultural implement may be driven by the working fluid to facilitate delivery of the agricultural product and/or may establish a vacuum pressure within the tanks 28 or supply lines. In some embodiments, the frame assembly 32 of the agricultural implement 10 may be adjustable to fold into a transport configuration (e.g., via rotation of wings about joints 34), as shown by arrows 36, and/or to pivot and align the frame assembly 32 with a direction of travel 38.

Figure 2:
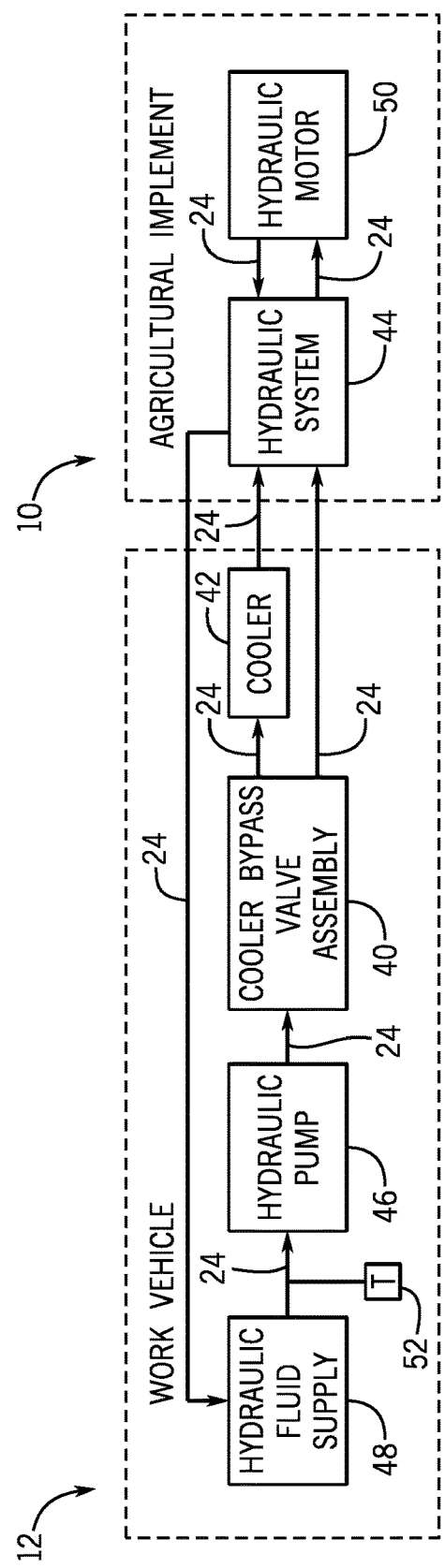
FIG. 2 is a diagrammatical representation of an embodiment of a hydraulic circuit that may be employed within the work vehicle and the agricultural implement of FIG. 1.

FIG. 2 is a diagrammatical representation of an embodiment of a hydraulic circuit that may be employed within the work vehicle 12 and the agricultural implement 10. In the illustrated embodiment, the work vehicle 12 includes a cooler bypass valve assembly 40 fluidly coupled to a hydraulic fluid cooler 42 by a hydraulic line 24. The cooler bypass valve assembly 40 is also fluidly coupled to a hydraulic system 44 of the agricultural implement 10 by a separate hydraulic line 24. Additionally, the cooler bypass valve assembly is fluidly coupled to a hydraulic pump 46, which provides hydraulic fluid flow to the hydraulic components of the work vehicle 12 and the agricultural implement 10. Further, the work vehicle 10 includes a hydraulic fluid supply 48, which provides the hydraulic fluid to the hydraulic pump 42. Furthermore, the hydraulic pump 46 and the hydraulic fluid supply 48 are fluidly coupled by a fluid line 24.

In the illustrated embodiment, the work vehicle 12 provides the hydraulic fluid flow to the agricultural implement 10 to provide flow to various hydraulic devices of the agricultural implement, such as a hydraulic motor 50 that is fluidly coupled to the hydraulic system 44. The hydraulic motor 50 may power a seed drive, a fan drive, a vacuum system, and so forth of the agricultural implement 10. As illustrated, the hydraulic fluid flows from the work vehicle 12 to the agricultural implement 10 and back via fluid lines 24.

Additionally, in the illustrated embodiment, the hydraulic fluid flows from the hydraulic pump 46 through the cooler bypass valve assembly 40 to either the hydraulic fluid cooler 42 or to the hydraulic system 44. A path of the hydraulic fluid is determined based on a temperature measurement from a temperature sensor 52. In the illustrated embodiment, the temperature sensor 52 is placed along the fluid line 24 between the hydraulic pump 46 and the hydraulic fluid supply 48, and the temperature sensor 52 measures the temperature of the hydraulic fluid in the fluid line 24 as the hydraulic fluid flows to the hydraulic pump 46. It may be noted, however, that the temperature sensor 52 may be located along any low pressure line (e.g., upstream of the pump 46) throughout the work vehicle 12 or the agricultural implement 10. If the temperature measurement of the hydraulic fluid is determined to be below a desired hydraulic fluid temperature, the cooler bypass valve assembly 40 directs the hydraulic fluid directly to the hydraulic system 44 of the agricultural implement 10, which enables the hydraulic fluid to rapidly increase its temperature. Additionally, if the temperature measurement of the hydraulic fluid is determined to be at or above the desired hydraulic fluid temperature, the cooler bypass valve assembly 40 directs the hydraulic fluid to the hydraulic fluid cooler 42 in order to maintain or reduce the temperature of the hydraulic fluid. Fluid then flows from the hydraulic fluid cooler 42 to the hydraulic system. While the cooler bypass valve assembly 40 and the hydraulic fluid cooler 42 are described herein as being part of the work vehicle 12, it may be noted that the cooler bypass valve assembly 40 and the hydraulic fluid cooler 42 may be positioned as part of the agricultural implement 10, or the cooler bypass valve assembly 40 and the hydraulic fluid cooler 42 may be positioned at any other suitable location between the hydraulic pump 46 and the hydraulic system 44.

Figure 3:
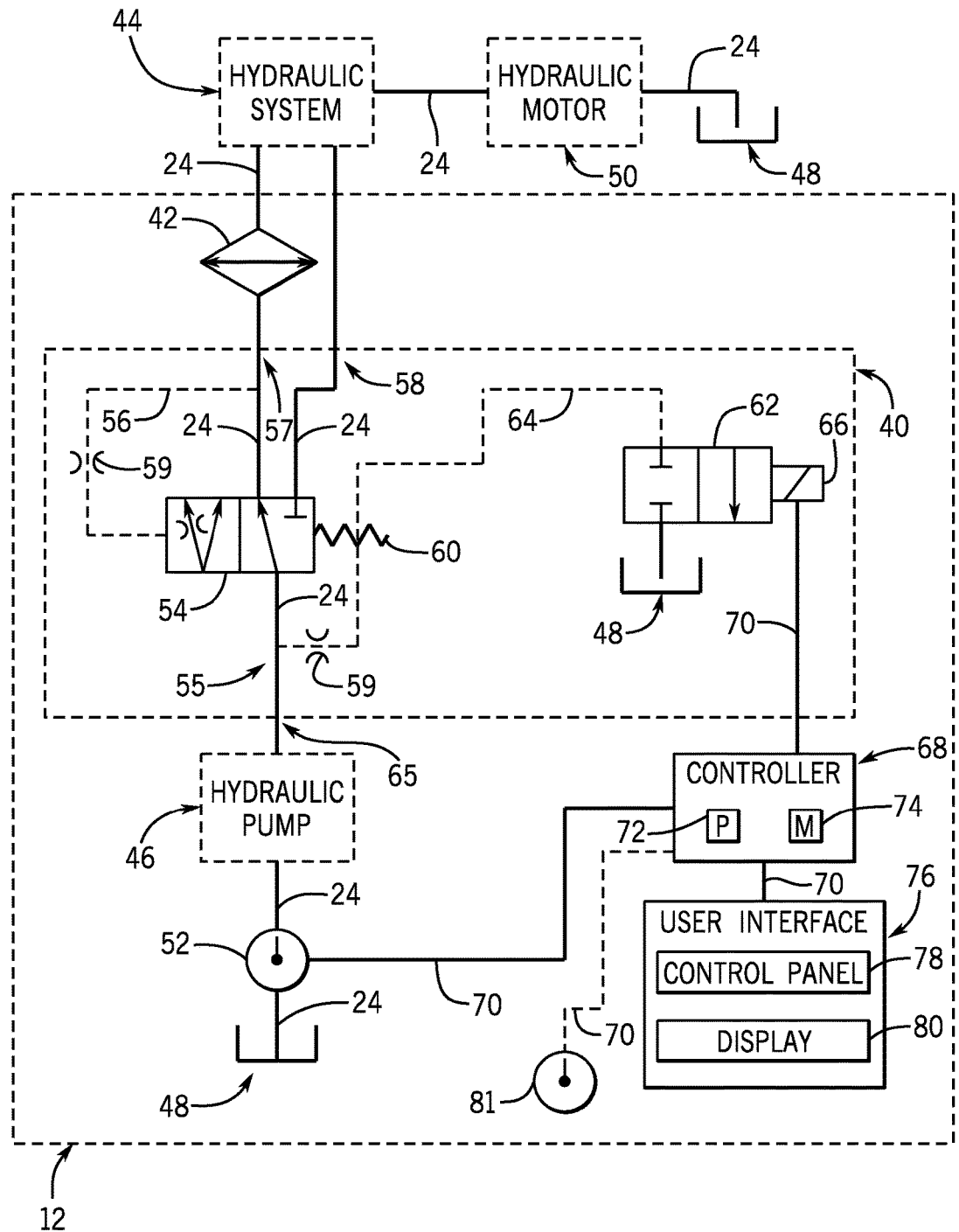
FIG. 3 is a schematic diagram of an embodiment of a cooler bypass valve assembly that may be employed within the hydraulic circuit of FIG. 2.

FIG. 3 is a schematic diagram of an embodiment of a cooler bypass valve assembly 40 that may be employed within the hydraulic circuit of FIG. 2. In the illustrated embodiment, the hydraulic pump 46 provides hydraulic fluid flow to the cooler bypass valve 54 of the cooler bypass valve assembly 40. The hydraulic pump 46 directs the flow toward the cooler bypass valve 54 by way of the hydraulic line 55. Further, the cooler bypass valve 54, in the illustrated embodiment, is a two-position, three-way valve. As such, the first position of the cooler bypass valve 54 is a cooler bypass position. Additionally, the second position of the cooler bypass valve 54 is a cooler position that directs the hydraulic fluid to the hydraulic fluid cooler 42. For example, in the illustrated embodiment, the cooler bypass valve 54 is displayed in the second position. In this position, the hydraulic fluid entering the cooler bypass valve 54 from the hydraulic line 55 is directed into a hydraulic fluid line 57, which couples the value 54 to the hydraulic fluid cooler 42. On the other hand, when the cooler bypass valve 54 is in the first position, a substantial portion of the flow is directed into the hydraulic system 44 of the agricultural implement 10 via hydraulic line 58, thereby substantially bypassing the hydraulic fluid cooler 42. While most of the hydraulic fluid enters the hydraulic line 58 while the cooler bypass valve 54 is in the first position, a portion of the hydraulic fluid is directed into the hydraulic fluid cooler 42. The hydraulic fluid continues to flow through the hydraulic fluid cooler 42 to substantially reduce or eliminate the possibility of an excessive thermal gradient on the hydraulic fluid cooler 42 when the hydraulic fluid flow returns to the hydraulic fluid cooler 42 upon the cooler bypass valve 54 returning to the second position.

Additionally, in the illustrated embodiment, when the hydraulic fluid flows into the hydraulic fluid cooler 42, an orifice in the hydraulic line 57 enables the hydraulic fluid to enter a pilot line 56. The pilot line 56 includes a flow restrictor 59 that limits the quantity of the hydraulic fluid flow while maintaining a hydraulic fluid pressure equal to the pressure of the hydraulic fluid entering the hydraulic fluid cooler 42. In the illustrated embodiment, the pressure of the hydraulic fluid in the pilot line 56 is applied to the cooler bypass valve 54 in an opposite direction than a force applied by a spring 60.

In the illustrated embodiment, a flow control valve 62 is fluidly coupled to a pilot line 64 that extends from the inlet line 55 to a side of the cooler bypass valve 54 and to the hydraulic fluid supply 48 while the flow control valve 62 is in a closed position, pressure in the pilot line 64 acts with the biasing force of the spring 60 to urge the cooler bypass valve 54 toward the second position. If a force associated with the pressure in the pilot line 56 is greater than the force being applied in the opposite direction, then the cooler bypass valve 54 moves into the first position to enable hydraulic fluid to bypass the hydraulic fluid cooler 42. As illustrated in FIG. 3, the flow control valve 62 is a two-position, two-way valve. However, it may be appreciated that the flow control valve 62 may have any suitable valve configuration to control the flow of hydraulic fluid in the pilot line 64. An orifice in the hydraulic fluid line 55 acts as a flow restrictor 59 and enables some hydraulic fluid to flow into the pilot line 64 from an inlet 65 to the cooler bypass valve assembly 40. While the flow control valve 62 is in the closed position, the pressure in the pilot line 64 acts with the spring 60 to provide a force on the cooler bypass valve 54 that is greater than the force provided by the pressure in pilot line 56, and thereby moving the valve to the second position providing hydraulic fluid flow to the hydraulic fluid cooler 42. Further, when a solenoid 66 of the illustrated embodiment drives the flow control valve 62 to move into an open position, the hydraulic fluid in the pilot line 64 drains into the hydraulic fluid supply 48, thereby causing the pressure in the pilot line 64 decrease. A decrease in pressure within the pilot line 64 enables the force associated with the pressure in the pilot line 56 to overcome the force of the spring 60 and the force associated with the pressure in the pilot line 64. Accordingly, the cooler bypass valve 54 moves into the first position, as illustrated. Furthermore, it may be noted that the solenoid 66 may be replaced by any other suitable actuator that may function to move the flow control valve 62 between the open position and the closed position.

Additionally, as illustrated, the solenoid 66 is in electrical communication with a controller 68 via a wire 70. The controller 68 drives the solenoid 66, thereby controlling the position of the flow control valve 62, thereby controlling the position of the cooler bypass valve 54. In the illustrated embodiment, the controller 68 includes a processor 72 and a memory 74. The processor 72 may execute instructions stored in the memory 74. The instructions may include programs that instruct the solenoid 66 to control the flow control valve 62. Additionally, the instructions may be carried out based on an input from a user interface 76. As illustrated, the user interface 76 is electrically coupled to the controller 68 via a wire 70. Further, the user interface 76 includes a control panel 78, which enables an operator of the work vehicle 12 to input commands to the controller 68. The user interface 76 also includes a display 80 to display information to the operator. Such information that may be displayed to the operator may include a temperature of the hydraulic fluid, a temperature of the ambient air surrounding the work vehicle, a hydraulic fluid pressure within the hydraulic line 57 entering the hydraulic fluid cooler 42, and any other value that may be of use to the user in determining how to control the flow control valve 62.

In addition to the operator controlling the position of the flow control valve 62, the controller 68 may also adjust the flow control valve 62 automatically based on a number of inputs. As illustrated, the controller 68 is in electrical communication with the temperature sensor 52 via a wire 70. The temperature sensor 52, in the illustrated embodiment, is capable of transmitting signals over the wire 70 to the controller indicative of the temperature of the hydraulic fluid. Based on the signal indicative of the temperature of the hydraulic fluid, the processor 72 of the controller 68 controls the flow control valve 62 based on the instructions stored in the memory 74. If the position of the flow control valve 62 is not already in the determined position based on the temperature signal received by the controller 68 from the temperature sensor 52, then the controller 68 instructs the solenoid 66 to drive the valve to the appropriate position.

For example, if the temperature signal is below a desired hydraulic fluid temperature, and the flow control valve 62 is in the closed position, then the controller 68 instructs the solenoid 66 to drive the flow control valve 62 to the open position. As such, the open position of the flow control valve 62 induces the pressure in the pilot line 64 to drop, enabling the force associated with the pressure in the pilot line 56 to urge the cooler bypass valve 54 to the first position. The first position directs the hydraulic fluid to bypass the hydraulic fluid cooler 42, thereby enabling the hydraulic fluid to rapidly reach the desired hydraulic fluid temperature.

Subsequently, when the hydraulic fluid reaches or exceeds the desired hydraulic fluid temperature, as indicated to the controller 68 by the temperature sensor 52, the controller 68 instructs the solenoid 66 to move the flow control valve 62 back to the closed position. Upon the flow control valve 62 reaching the closed position, the pressure in the pilot line 64 increases. The increase in force associated with the pressure in the pilot line 64 acts with the force of the spring 60 to overcome the force associated with the pressure in the pilot line 56, thereby urging the cooler bypass valve 54 back to the second position. When the cooler bypass valve 54 is returned to the second position, the flow of the hydraulic fluid moves toward the hydraulic fluid cooler 42.

In certain embodiments, the desired hydraulic fluid temperature may be determined based on external factors such as the geographic area in which the work vehicle 12 is operating and/or the ambient air temperature surrounding the work vehicle 12. In certain climates, such as a hot desert climate, it may be desirable for the desired hydraulic fluid temperature to be set lower to substantially reduce or eliminate the possibility of overheating of the hydraulic system 44. Additionally, in colder climates, the desired hydraulic fluid temperature may be set at a higher value because the hydraulic fluid flowing through the hydraulic circuit may be chilled by the ambient air in addition to the hydraulic fluid cooler 42. Further, the work vehicle 12 may have one or more temperature sensors 81 on the body 14 of the work vehicle 12. The temperature sensors 81 may measure ambient air temperature around the work vehicle 12 and send a signal to the controller 68 indicative of the ambient air temperature. The processor 72 of the controller 68 may use the instructions from the memory 74 along with the ambient air temperature measurement and a measurement from the temperature sensor 52 to determine a desired position of the flow control valve 62. In this embodiment, the ambient air temperature represents data that the processor 72 uses to either increase, decrease, or maintain the hydraulic fluid temperature within the hydraulic system 44. Furthermore, in at least one embodiment, the operator of the work vehicle may manually set the desired hydraulic fluid temperature and any hydraulic fluid temperature threshold values via the control panel 78 of the user interface 76. Manually setting the desired hydraulic fluid temperature facilitates greater flexibility of the hydraulic system.

Figure 4:
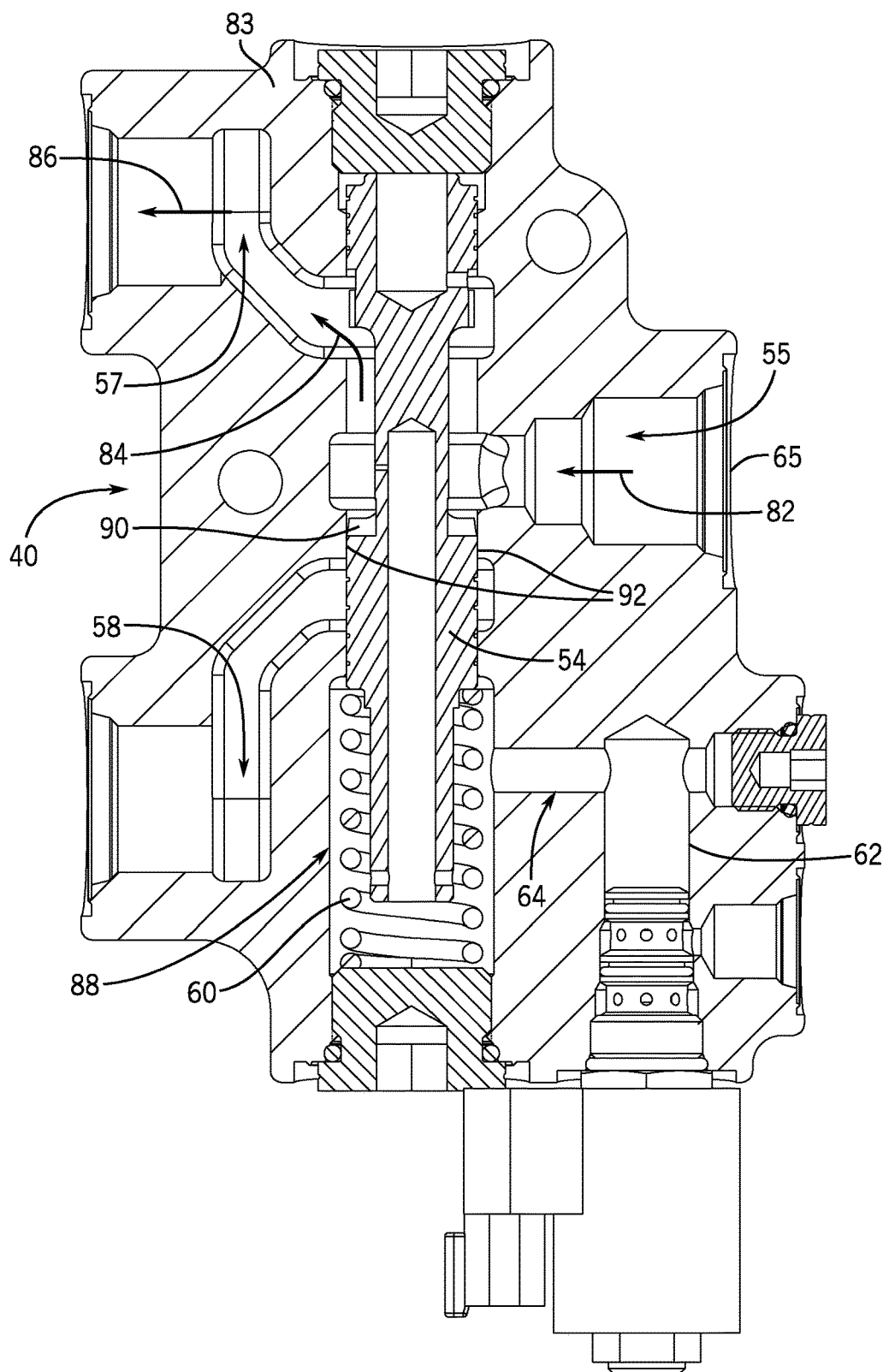
FIG. 4 is a cross-sectional view of an embodiment of a valve block of the cooler bypass valve assembly, including a cooler bypass valve in a non-bypass position.

FIG. 4 is a cross-sectional view of an embodiment of a valve block of the cooler bypass valve assembly 40, including the cooler bypass valve 54 in the second position within a housing 83. In the illustrated embodiment, the hydraulic fluid enters the cooler bypass valve assembly 40 by way of the inlet 65 into the hydraulic line 55 and flows in a direction 82. While the cooler bypass valve 54 is in the second position, as illustrated, the hydraulic fluid continues to flow beyond the cooler bypass valve 54 in a direction 84 toward the hydraulic line 57. The hydraulic line 57 directs the hydraulic fluid to flow in a direction 86 toward the hydraulic fluid cooler 42. After the hydraulic fluid flows through the hydraulic fluid cooler 42, the hydraulic fluid enters the hydraulic system 44 of the agricultural implement 10 to drive the hydraulic motor 50 of the agricultural implement 10, for example. From the hydraulic motor 50, the hydraulic fluid returns to the hydraulic fluid supply 48 for subsequent use as a hydraulic fluid source for the hydraulic pump 46.

Additionally, in the illustrated embodiment, the cooler bypass valve assembly 40 includes a spring chamber 88. The spring chamber 88 houses a lower portion of the cooler bypass valve 54, as well as the spring 60, which functions to urge the cooler bypass valve 54 toward the second position. The orifice in the hydraulic fluid line 55 provides a restricted flow of the hydraulic fluid to the spring chamber 88 and to the pilot line 64. While the flow control valve 62 is in the closed position, as illustrated, the force associated with the pressure in the pilot line 64 acts with the force of the spring 60 to urge the cooler bypass valve 54 toward the second position. Acting in the opposite direction of the force of the spring and the force associated with the pressure in the pilot line 64 is the force associated with the pressure in the pilot line 56. The force associated with the pressure in the pilot line 56 acts on the cooler bypass valve 54 to urge the cooler bypass valve 54 toward the first position. The force associated with the pressure in the pilot line 56 is less than the force of the spring 60 and the force associated with the pressure in the pilot line 64. As such, the cooler bypass valve 54 in FIG. 4 is in the second position.

Further, a notch 90 is illustrated in the cooler bypass valve 54. The notch 90 allows the flow of the hydraulic fluid to gradually increase or decrease as the cooler bypass valve 54 moves between the first position and the second position. Additionally, a seal between the cooler bypass valve 54 and a contact point 92 on the valve block of the cooler bypass valve assembly 40 blocks the flow of hydraulic fluid to hydraulic line 58 when the cooler bypass valve assembly 40 is in the second position, as illustrated in FIG. 4. In the illustrated embodiment, the hydraulic fluid entering the cooler bypass valve assembly is directed to the hydraulic fluid cooler 42.

Figure 5:
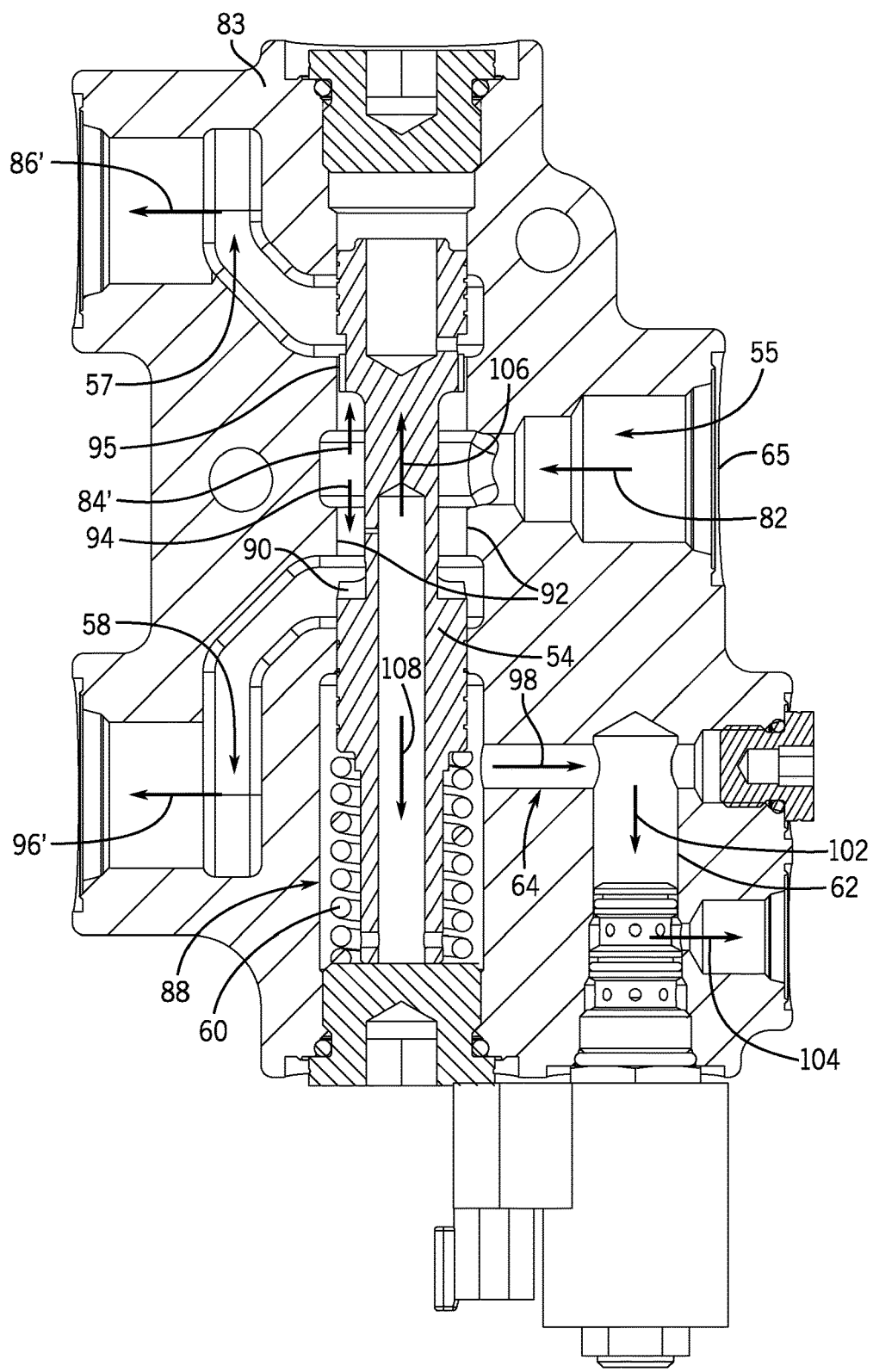
FIG. 5 is a cross-sectional view of the valve block of FIG. 4, with the cooler bypass valve in a bypass position.

FIG. 5 is a cross-sectional view of the valve block of the cooler bypass valve assembly 40, with the cooler bypass valve 54 in the first position. In the illustrated embodiment, the hydraulic fluid enters the cooler bypass valve assembly 40 by way of the inlet 65 into the hydraulic line 55 and flows in the direction 82. While the cooler bypass valve 54 is in the first position, the hydraulic fluid is provided with two paths. One path is in a direction 84' and the other path extends along a direction 94. The path extending along direction 84' is created by a gap 95 between the walls of the cooler bypass valve 54 and the valve block structure. The gap 95 functions as a flow restrictor and enables a reduced amount of the hydraulic fluid to flow in a direction 86' into the hydraulic fluid cooler 42. As discussed above, continuing the flow of hydraulic fluid to the hydraulic fluid cooler 42 may be beneficial to substantially reduce or eliminate the possibility of an excessive thermal gradient that the hydraulic fluid cooler 42 might experience when coming into contact with warm hydraulic fluid. Additionally, the hydraulic fluid flows in the direction 94 toward the cooler bypass while the cooler bypass valve 54 is in the first position. The flow of the hydraulic fluid in the direction 94 directs a substantial portion of the hydraulic fluid to the hydraulic line 58. From the hydraulic line 58, the hydraulic fluid flows in a direction 96 directly into the hydraulic system 44 of the agricultural implement 10 thereby bypassing the hydraulic fluid cooler 42.

Moreover, while the cooler bypass valve 54 is in the first position, as illustrated, the flow control valve 62 is in the open position. The open position of the flow control valve 62 enables the hydraulic fluid that enters the pilot line 64 to flow in a direction 98 toward the flow control valve 62. The hydraulic fluid then flows through the valve 62 in directions 102 and 104 out of the cooler bypass valve assembly 40 and toward the hydraulic fluid supply 48 for subsequent use as the hydraulic fluid source for the hydraulic pump 46.

As discussed above, while the flow control valve 62 is in the open position, the pressure in the pilot line 64 decreases as the hydraulic fluid in the pilot line 64 drains into the hydraulic fluid supply 48. As the pressure in the pilot line 64 decreases, the force associated with the pressure in the pilot line 56 overcomes the force of the spring 60 and the force associated with the pressure in the pilot line 64. As such, the cooler bypass valve 54 moves in a direction 108 toward the first position, as illustrated in FIG. 5. Once the hydraulic fluid reaches the desired hydraulic fluid temperature, the flow control valve 62 is actuated toward the closed position. While the flow control valve 62 is in the closed position, the pressure in the pilot line 64 increases until the pressure reaches a value at which the combined force of the spring 60 and the force associated with the pressure in the pilot line 64 is greater than the force associated with the pressure in the pilot line 56. The force of the spring 60 and the force associated with the pressure in the pilot line 64 then urges the cooler bypass valve 54 in a direction 106 toward the second position, as illustrated in FIG. 4. While FIGS. 4 and 5 illustrate the cooler bypass valve 54 linearly moveable between the first position and the second position, the cooler bypass valve 54 may also be rotationally moveable between the first position and the second position. As such, the hydraulic fluid may interact with the cooler bypass valve 54 in such a manner to rotate the cooler bypass valve 54 in one direction or another facilitating a rotational movement between the first position and the second position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A cooler bypass valve assembly for an agricultural implement, comprising:
    a cooler bypass valve configured to receive hydraulic fluid from a hydraulic supply, wherein a cooler bypass valve position is adjustable between a first cooler bypass position configured to facilitate flow of the hydraulic fluid through the cooler bypass valve to a cooler bypass and to facilitate a restricted flow of the hydraulic fluid through the cooler bypass valve to a hydraulic fluid cooler, and a second cooler bypass position configured to block flow of the hydraulic fluid to the cooler bypass and to facilitate flow of the hydraulic fluid through the cooler bypass valve to the hydraulic fluid cooler, and wherein the hydraulic fluid cooler is configured to reduce a temperature of the hydraulic fluid and to direct the hydraulic fluid to a hydraulic system, and the cooler bypass is configured to direct the hydraulic fluid around the hydraulic fluid cooler to the hydraulic system; and
    a controller configured to control the cooler bypass valve position based on the temperature of the hydraulic fluid.

2. The cooler bypass valve assembly of claim 1, comprising:
    a flow control valve configured to selectively facilitate flow of the hydraulic fluid from one side of the cooler bypass valve to control the cooler bypass valve position, wherein a flow control valve position is adjustable between a first position configured to adjust the cooler bypass valve to the first cooler bypass position and a second position configured to adjust the cooler bypass valve to the second cooler bypass position; and
    a temperature sensor communicatively coupled to the controller and configured to output a signal indicative of the temperature of the hydraulic fluid;
    wherein the controller is communicatively coupled to the flow control valve and configured to control the flow control valve position based on the signal output from the temperature sensor indicative of the temperature of the hydraulic fluid.

3. The cooler bypass valve assembly of claim 2, wherein the temperature sensor is configured to measure the temperature of the hydraulic fluid in a low pressure line upstream from a hydraulic pump.

4. The cooler bypass valve assembly of claim 2, wherein the controller is configured to instruct the flow control valve to transition to the first position while the temperature of the hydraulic fluid is below a first threshold value, and to instruct the flow control valve to transition to the second position while the temperature of the hydraulic fluid is above a second threshold value.

5. The cooler bypass valve assembly of claim 4, comprising a user interface configured to output a second signal to the controller indicative of the first threshold value, the second threshold value, or a combination of the threshold values.

6. The cooler bypass valve assembly of claim 2, wherein a first side of the cooler bypass valve is in fluid communication with a hydraulic supply line from the hydraulic supply and with the flow control valve, and a second side of the cooler bypass valve is in fluid communication with a hydraulic fluid cooler supply line to the hydraulic fluid cooler;
    wherein the cooler bypass valve is configured to transition to the first cooler bypass position while a first pressure of the hydraulic fluid in the hydraulic fluid cooler supply line exceeds a second pressure of the hydraulic fluid in the hydraulic supply line by a threshold value, and to otherwise transition to the second cooler bypass position.

7. The cooler bypass valve assembly of claim 2, wherein the cooler bypass valve is a two-position, three-way valve, and the flow control valve is a two-position, two-way valve.

8. The cooler bypass valve assembly of claim 2, comprising a spring configured to bias the cooler bypass valve toward the second cooler bypass position.

9. The cooler bypass valve assembly of claim 8, wherein a first side of the cooler bypass valve is in fluid communication with a hydraulic supply line from the hydraulic supply and with the flow control valve, and a second side of the cooler bypass valve is in fluid communication with a hydraulic fluid cooler supply line to the hydraulic fluid cooler;
    wherein the cooler bypass valve is configured to transition to the first cooler bypass position while a first pressure of the hydraulic fluid in the hydraulic fluid cooler supply line exceeds a combined pressure of a second pressure of the hydraulic fluid in the hydraulic supply line and a third pressure of the spring, and to otherwise transition to the second cooler bypass position.

10. The cooler bypass valve assembly of claim 2, wherein the controller is configured to cause the flow control valve to be in the first position when the temperature of the hydraulic fluid is below a predetermined temperature.

11. The cooler bypass valve assembly of claim 10, wherein the controller is configured to cause the flow control valve to be in the second position when the temperature of the hydraulic fluid is equal to or exceeds the predetermined temperature.

12. The cooler bypass valve assembly of claim 10, further comprising an ambient temperature sensor configured to output a second signal indicative of an ambient air temperature of the air surrounding an area in which the cooler bypass valve assembly is located, wherein the controller is configured to adjust the predetermined temperature based on the ambient air temperature.

13. A cooler bypass valve assembly for an agricultural implement, comprising:
    a valve block, comprising:
        a housing;
        a cooler bypass valve disposed within the housing, wherein the cooler bypass valve is moveable between a cooler bypass position and a cooler position, and the cooler bypass valve is configured to receive hydraulic fluid from a hydraulic fluid supply, to facilitate flow of the hydraulic fluid through the cooler bypass valve to a cooler bypass and to facilitate a restricted flow of the hydraulic fluid through the cooler bypass valve to a hydraulic fluid cooler while the cooler bypass valve is in the cooler bypass position, and to block flow of the hydraulic fluid to the cooler bypass and to facilitate flow of the hydraulic fluid through the cooler bypass valve to the hydraulic fluid cooler while the cooler bypass valve is in the cooler position, and wherein the hydraulic fluid cooler is configured to reduce a temperature of the hydraulic fluid, and the cooler bypass is configured to direct the hydraulic fluid around the hydraulic fluid cooler to a hydraulic system; and a flow control valve disposed within the housing and configured to selectively transition the cooler bypass valve between the cooler bypass position and the cooler position by controlling hydraulic fluid pressure to one side of the cooler bypass valve.

14. The cooler bypass valve assembly of claim 13, comprising:
a control assembly configured to control the flow control valve based on the temperature of the hydraulic fluid, wherein a flow control valve position is adjustable between a first position configured to facilitate flow of the hydraulic fluid from the one side of the cooler bypass valve and a second position configured to block flow of the hydraulic fluid from the one side of the cooler bypass valve, and wherein the control assembly comprises:
a temperature sensor configured to output a signal indicative of the temperature of the hydraulic fluid; and
a controller communicatively coupled to the temperature sensor and to the flow control valve, wherein the controller is configured to control the flow control valve position based on the signal.

15. The cooler bypass valve assembly of claim 14, wherein the temperature sensor is configured to measure the temperature of the hydraulic fluid in a low pressure line upstream from a hydraulic pump.

16. The cooler bypass valve assembly of claim 13, wherein the cooler bypass valve is a two-position, three-way valve.

17. A cooler bypass valve assembly for an agricultural implement, comprising:
a cooler bypass valve fluidly coupled to an inlet of the cooler bypass valve assembly, wherein the cooler bypass valve is configured to facilitate flow of hydraulic fluid through the cooler bypass valve from the inlet to a cooler bypass and to facilitate a restricted flow of the hydraulic fluid through the cooler bypass valve from the inlet to an outlet of the cooler bypass valve assembly while a first hydraulic pressure at the outlet exceeds a second hydraulic pressure at the inlet by a threshold value, and to otherwise block flow of the hydraulic fluid to the cooler bypass and to facilitate flow of the hydraulic fluid through the cooler bypass valve to the outlet, wherein the outlet is configured to extend to a hydraulic fluid cooler configured to reduce a temperature of the hydraulic fluid, and the cooler bypass is configured to direct the hydraulic fluid around the hydraulic fluid cooler to a hydraulic system;

a flow control valve fluidly coupled to the inlet, wherein the flow control valve is adjustable to vary hydraulic pressure at the inlet to control the cooler bypass valve.

18. The cooler bypass valve assembly of claim 17, comprising:
a temperature sensor configured to output a first signal indicative of the temperature of the hydraulic fluid, wherein the temperature sensor is configured to measure the temperature of the hydraulic fluid in a low pressure line upstream from a hydraulic pump;
an ambient temperature sensor configured to output a second signal indicative of an ambient temperature; and
a controller communicatively coupled to the flow control valve, to the temperature sensor, and to the ambient temperature sensor, wherein the controller is configured to receive the first signal from the temperature sensor indicative of the temperature of the hydraulic fluid and the second signal from the ambient temperature sensor indicative of the ambient temperature, and the controller is configured to control the flow control valve based on the temperature of the hydraulic fluid and on the ambient temperature.

19. The cooler bypass valve assembly of claim 18, wherein the flow control valve comprises an actuator, and the actuator is communicatively coupled to the controller.

20. The cooler bypass valve assembly of claim 19, comprising a user interface configured to output a third signal to the controller indicative of one or more threshold temperatures, wherein the controller is configured to instruct the flow control valve to transition to a first position while the temperature of the hydraulic fluid is below the one or more threshold temperatures, and to instruct the flow control valve to transition to a second position while the temperature of the hydraulic fluid is above the one or more threshold temperatures.

* * * * *